United States Patent
Kangas et al.

(10) Patent No.: US 6,490,454 B1
(45) Date of Patent: Dec. 3, 2002

(54) DOWNLINK OBSERVED TIME DIFFERENCE MEASUREMENTS

(75) Inventors: Ari Kangas, Uppsala; Erik Larsson, Kista, both of (SE); Sven Fischer, Nürnberg (DE); Patrik Lundqvist, Solna (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/131,150

(22) Filed: Aug. 7, 1998

(51) Int. Cl.[7] .................................................. H04Q 7/20
(52) U.S. Cl. ........................ 455/456; 455/502; 342/457
(58) Field of Search ............................. 455/12.1, 67.4, 455/67.6, 422, 427, 432, 436, 456, 502, 503; 342/457; 370/324

(56) References Cited

U.S. PATENT DOCUMENTS

| | | | | |
|---|---|---|---|---|
| 5,014,344 A | * | 5/1991 | Goldberg | 455/67.6 |
| 5,218,717 A | * | 6/1993 | Reithberger | 455/67.6 |
| 5,293,645 A | * | 3/1994 | Sood | 455/67.6 |
| 5,317,323 A | | 5/1994 | Kennedy et al. | 342/457 |
| 5,327,144 A | | 7/1994 | Stilp et al. | 342/387 |
| 5,365,516 A | | 11/1994 | Jandrell | 370/18 |
| 5,367,524 A | * | 11/1994 | Rideout, Jr. et al. | 370/324 |
| 5,508,708 A | | 4/1996 | Ghosh et al. | 342/457 |
| 5,512,908 A | | 4/1996 | Herrick | 342/387 |
| 5,519,760 A | | 5/1996 | Borkowski et al. | 379/59 |
| 5,542,100 A | | 7/1996 | Hatakeyama | 455/56.1 |
| 5,600,706 A | | 2/1997 | Dunn et al. | 379/59 |
| 5,613,211 A | * | 3/1997 | Matsuno | 455/67.6 |
| 5,629,710 A | | 5/1997 | Sawada | 342/457 |
| 5,711,003 A | | 1/1998 | Dupuy | 455/436 |
| 5,724,243 A | * | 3/1998 | Westerlage et al. | 342/457 |
| 5,758,288 A | | 5/1998 | Dunn et al. | 455/456 |
| 5,784,368 A | * | 7/1998 | Weigand et al. | 455/502 |
| 5,875,402 A | * | 2/1999 | Yamawaki | 455/502 |

FOREIGN PATENT DOCUMENTS

| | | |
|---|---|---|
| WO | WO 95/26510 | 10/1995 |
| WO | WO 96/35306 | 11/1996 |
| WO | 96/35306 | * 11/1996 |
| WO | WO 00/08886 | 2/2000 |

OTHER PUBLICATIONS

Rantalainen, et al.; "Mobile Station Based Location Calculation in E–OTD Method", Nokia, Jul. 17, 1998.

* cited by examiner

*Primary Examiner*—Nay Maung
(74) *Attorney, Agent, or Firm*—Jenkens & Gilchrist, a Professional Corporation (57) ABSTRACT

A mobile communication station in a wireless communication network is used to measure the respective times of arrival of radio signals respectively transmitted by a plurality of radio transmitters in the network. The mobile communication station is provided with real time difference information indicative of differences between a time base used by a radio transmitter serving the mobile communication station and respective time bases used by the other radio transmitters. The mobile communication station determines, in response to the real time difference information and relative to the time base used by the radio transmitter serving the mobile communication station, a plurality of points in time at which the respective radio signals are expected to arrive the mobile communication station. For each radio signal, the mobile communication station monitors for arrival of the radio signal during a period of time after the point in time at which the radio signal is expected to arrive.

46 Claims, 5 Drawing Sheets

DOWNLINK OBSERVED TIME DIFFERENCE MEASUREMENTS

BACKGROUND OF THE INVENTION

The ability to locate the position of a mobile communication unit operating in a wireless communication system (for example, a cellular communication system) provides many well known advantages. Exemplary uses of such position location capability include security applications, emergency response applications, and travel guidance applications. Several known techniques for providing position location involve the measurement of certain characteristics of communication signals, such as the time of arrival (TOA), the round trip delay, or the angle of arrival of a communication signal. Some of these techniques can be further divided into uplink or downlink approaches In the uplink category, a base transceiver station (BTS) or other receiver performs the measurements on communication signals originating at a mobile communication unit (or mobile station). In downlink approaches, the mobile station performs the measurements on signals originating at base transceiver stations or other transmitters.

Figure 1:
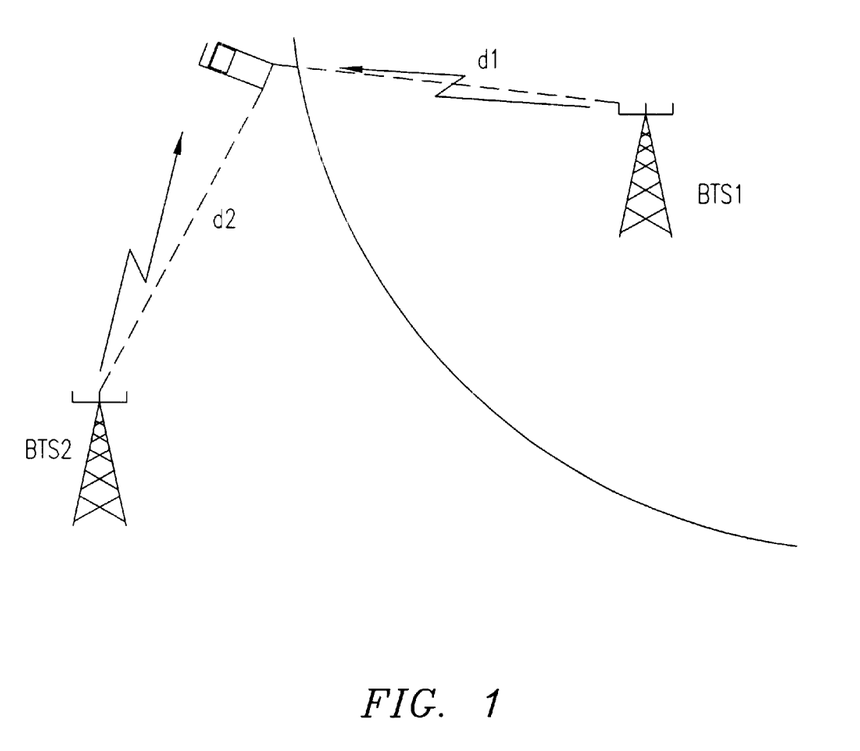
FIG. 1 diagrammatically illustrates how the location of a mobile station can be determined using downlink observed time difference measurements.

One example of a downlink technique for locating the position of a mobile station is the observed time difference (OTD) technique. This technique will now be described with respect to the Global System for Mobile Communication (GSM), which is exemplary of a cellular communication system in which downlink observed time difference techniques are applicable. The OTD technique is implemented, for example, by having the mobile station measure the time difference between arrival times of selected radio signals transmitted from different base transceiver stations. Assuming the geometry shown in FIG. 1, and further assuming that two signals are transmitted simultaneously from the base transceiver stations BTS1 and BTS2, and letting T1 and T2 denote the times of arrival of the respective signals at the mobile station, then the observed time difference OTD is given by the following equation:

$$T1-T2=(d1-d2)/c, \qquad \text{(Eq. 1)}$$

where d1 and d2 are the respective distances from BTS1 and BTS2 to the mobile station. The locations of BTS1 and BTS2 are known, and the possible locations of the mobile station are described by the hyperbola 15 shown in FIG. 1. By combining measurements from at least three base transceiver stations, a position estimate for the mobile station can be obtained.

Most conventional cellular communication systems (including GSM systems) are asynchronous, that is, each base transceiver station uses its own internal clock reference to generate its frame and time slot structure. Therefore, the frame structures of the different base transceiver stations will tend to drift in time relative to one another, because clocks are not perfectly stable. As a consequence, an OTD measurement is not really meaningful for locating the position of a mobile station unless the differences in timing between the base transceiver stations being used is known. This difference, often referred to as the real time difference or RTD, represents the actual difference in absolute time between the transmission of respective signals (e.g., respective synchronization bursts in GSM) from respective base transceiver stations, which signals would be transmitted simultaneously if the frame structures of the base transceiver stations were perfectly synchronized.

Among several possible approaches to determine the real time difference RTD between base transceiver stations, two conventional examples are: absolute time stamping in the respective base transceiver stations; and use of stationary reference mobiles located in known positions. In the latter example, the reference mobile measures downlink signals sent from various base transceiver stations. Because the respective distances between the various base transceiver stations and the stationary reference mobile station are known, the expected time difference in arrival times of the respective signals from the base transceiver stations can be easily calculated. The real time difference RTD between base transceiver stations is simply the difference between the expected time difference of arrival and the observed time difference of arrival actually observed at the reference mobile station. The reference mobile station can periodically make the downlink time of arrival measurements and report them to a mobile location node in the network so that the network can maintain an updated record of the RTDs.

The techniques underlying known OTD methods are very similar to procedures used conventionally by mobile stations to synchronize to a serving base transceiver station and make measurements on a number of neighboring base transceiver stations as instructed by the serving cell (as in mobile assisted hand-off operations). The mobile station needs to know which base transceiver stations are to be monitored for OTD measurements. This information can typically be provided in conventional system information messages broadcasted in the cell, for example on a GSM cell's BCCH (broadcast control channels) frequency. This system information typically includes a list of frequencies of neighboring cells which are to be measured. The mobile station scans the designated frequencies to detect a frequency correction burst, which is an easily identifiable burst that appears approximately every 50 ms in GSM.

After successful detection of a frequency correction burst, the mobile station knows that in GSM the next frame will contain a synchronization burst SB. The synchronization burst SB contains the Base Station Identity Code (BSIC) and information indicative of the frame number of the current frame in which the burst SB is occurring. The mobile station measures the time of arrival of the synchronization burst SB at the mobile station relative to the timing of mobile station's own serving cell. Since now the mobile station knows the frame structure of the neighboring base transceiver station relative to its own serving base transceiver station timing, it is possible to repeat the time of arrival measurements to improve accuracy. This procedure is repeated until all frequencies (i.e., all BTSs) on the list have been measured. The observed time difference values recorded by the mobile station are then transferred to a mobile station location node in the cellular system, which node performs the position determination based on the observed time difference values, the real time difference values and the geographic locations of the base transceiver stations.

Because the mobile station does not know when the frequency correction burst (and thus the following synchronization burst SB) will appear, the brute force method described above, namely monitoring for the frequency correction burst, must be used.

The time required to capture a synchronization burst will depend on the measurement mode. OTD measurements can be made, for example, when call setup is being performed on a GSM SDCCH (Stand-alone Dedicated Control Channel), or during idle frames when the mobile station is in call mode, or during speech interrupt. For example, if the mobile station makes the measurements in call mode, then the mobile station can only make measurements during idle frames, which conventionally occur in GSM systems every 120 ms. The probability that a particular synchronization burst will appear within the idle frame is approximately 1 in 10, because the synchronization burst conventionally occurs once every ten frames in GSM. Accordingly, on average, 5 idle frames will be needed, meaning 0.6 seconds per base transceiver station. Thus, if it is desired to measure at least 6 neighboring base transceiver stations, an average measurement time of 3 or 4 seconds will be required, which may be prohibitively long in many applications.

The mobile station is guaranteed to have measured the synchronization burst SB if the mobile station captures and stores all signals (for example, all signals on the BTS's BCCH frequency in GSM) for 10 consecutive frames. However, providing the mobile station with the memory and computational capacity to capture (and thereafter process) all signal information in 10 consecutive frames is disadvantageously complex.

Moreover, in areas such as urban areas characterized by high interference levels, and in rural areas with large distances between base transceiver stations, the probability of detecting the synchronization burst SB may be unacceptably low, because the signals will typically be characterized by low signal-to-noise ratios.

Due also to the low signal-to-noise ratio, it is typically very difficult to decode the BSIC in the synchronization burst SB. The probability of taking ghost spikes instead of a synchronization burst SB is therefore disadvantageously increased in instances of low signal-to-noise ratio.

It is therefore desirable to improve the mobile station's ability to detect downlink signals used in conventional downlink observed time difference approaches.

The present invention attempts to overcome the aforementioned disadvantages of conventional downlink observed time difference approaches by providing for improved sensitivity in detecting the downlink communication signals used for making observed time difference measurements at mobile stations.

DETAILED DESCRIPTION

Figure 2:
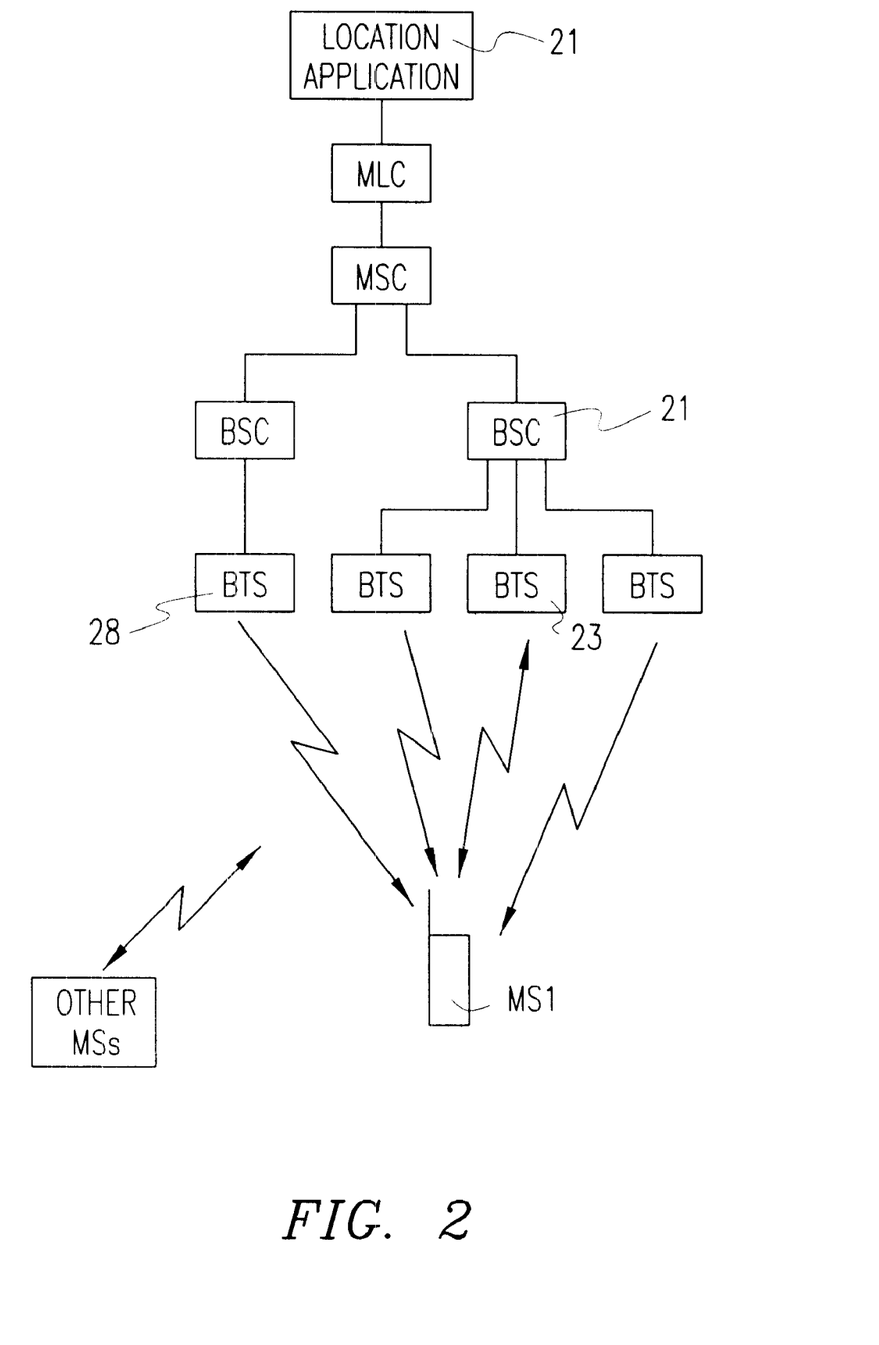
FIG. 2 is a block diagram of an exemplary wireless communications system including downlink observed time difference measurement capability according to the present invention.

FIG. 2 illustrates one example of a pertinent portion of a wireless communication system including the downlink observed time difference measurement capability according to the present invention. The invention is implemented in a GSM network in the example of FIG. 2. As shown in FIG. 2, a GSM mobile switching center MSC is coupled for communication with a plurality of GSM base station controllers BSCs, which are in turn coupled to communicate with one or more GSM base transceiver stations BTSs. The base transceiver stations are capable of radio communication with a plurality of mobile stations MSs via the air interface. Communication from the MSC to the MSs via the BSCs and the BTSs is well known in the art.

FIG. 2 also includes a mobile location center MLC coupled to communicate bidirectionally with the mobile switching center MSC using conventional GSM signaling protocol. In FIG. 2, the MLC can receive a request to locate the position of a mobile station MS1. Such a request is typically received from a location application 21 coupled to communicate with the MLC. The location application 21 can be a node within the network itself, or an external location application. In response to the request to locate the position of mobile station MS1, the MLC interrogates the network to thereby determine the serving BTS 23 (i.e., the serving GSM cell), and decides which BTSs should be selected for the downlink observed time difference measurements.

The MLC can then generate a positioning request message for mobile station MS1, indicating the frequencies and BSICs (the BSICs are conventionally available in networks such as the GSM network) of the base transceiver stations selected to be monitored, and the real time differences RTDs between the serving BTS and each of the selected BTSs. The positioning request message can be communicated from the MLC to MS1 via MSC, BSC 21, BTS 23, and the air interface between BTS 23 and MS1. Because MS1 knows when synchronization bursts will arrive from its own serving BTS, MS1 can use the RTD information to calculate approximately when synchronization bursts will arrive from the selected neighboring BTSs. This will be described in more detail hereinafter.

The aforementioned information can also be sent to MS1 as a dedicated message during, for example call setup. Moreover, the aforementioned information can also be sent to MS1 periodically on a broadcast control channel as a system information message. The RTDs can be calculated by the MLC using OTD information received from a reference mobile station, as described hereinabove, or the RTDs can be provided to the MLC using other conventional techniques.

Figure 3:
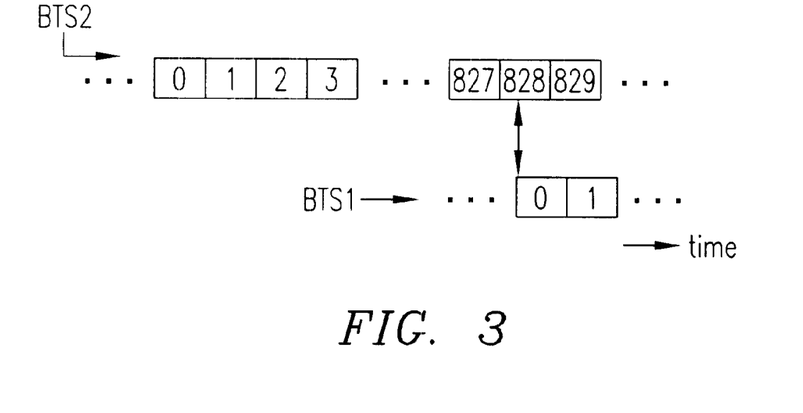
FIG. 3 illustrates one example of relative timing difference between base transceiver stations such as shown in FIG. 2.
Figure 4:
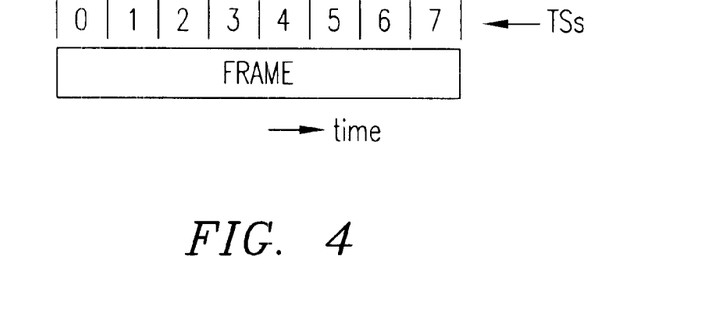
FIG. 4 illustrates an exemplary time slot structure of the frames of FIG. 3.
Figure 5:
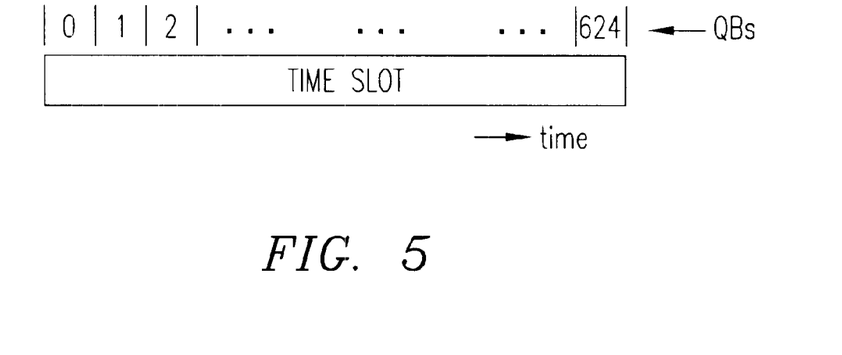
FIG. 5 illustrates an exemplary quarter bit structure of the time slot of FIG. 4.

FIGS. 3–5 illustrate the concept of real time differences among base transceiver stations in GSM networks such as the example GSM network portion of FIG. 2.

FIG. 3 illustrates the real time difference between the frame structure timing of a pair of base transceiver stations designated in FIG. 3 as BTS2 and BTS1. In GSM, the TDMA frames used by the base transceiver stations are numbered in a repetitive cyclic pattern, each cycle (also called a hyperframe) including 2,715,648 frames numbered as frame 0 through frame 2,715,647. In the example of FIG. 3, frame 0 of BTS1 timewise overlaps with frame 828 of BTS2.

Referring now to FIG. 4, each TDMA frame in GSM is divided into eight time slots TS, numbered time slot 0 through time slot 7. As shown in FIG. 5, each GSM time slot is further divided into 625 quarter bits QB, so that during each time slot a total of 625/4=156.25 bits are transmitted. The real time difference RTD between BTS2 and BT1 is thus conventionally expressed as the triplet (FND, TND, QND), wherein FND is the difference (FN2−FN1) between the TDMA frame numbers of BTS2 and BTS1, TND is the difference (TN2−TN1) between the time slot numbers of BTS2 and BTS1, and QND is the difference (QN2−QN1) between the quarter bit numbers of BTS2 and BTS1. For example, with reference to FIGS. 3–5, if quarter bit 0 of time slot 0 of frame 0 of BTS1 is aligned in time with quarter bit 37 of time slot 6 of frame 828 of BTS2, then the real time difference RTD between BTS2 and BTS1 is given by the triplet (FN2−FN1, TN2−TN1, QN2−QN1), where FN2, TN2 and QN2 are the frame number, time slot number and quarter bit number of BTS2, and FN1, TN1 and QN1 are the same parameters of BTS1. Thus, the triplet is (828−0, 6−0, 37−0), or simply (828, 6, 37).

When the mobile station MS1 receives from MLC the real time difference RTD between its own serving base transceiver station, for example BTS1 of FIG. 3, and another base transceiver station on which it is to make downlink time of arrival measurements, for example BTS2 of FIG. 3, the mobile station MS1 can use the RTD triplet (FND, TND, QND) along with the known frame structure timing (FN1, TN1, QN1) of the serving base transceiver station BTS1 to determine the frame structure timing of BTS2 relative to that of BTS1. The following calculations can be made by the mobile station MS1 to determine the current frame number FN2 of BTS2 at any given point (FN1, TN1, QN1) in the time base of BTS1.

$$QN2'=QN1+QND \qquad (Eq.\ 2)$$

$$TN2'=TN1+TND+(QN2'\,div\,625) \qquad (Eq.\ 3)$$

$$FN2'=FN1+FND+(TN2'\,div\,8) \qquad (Eq.\ 4)$$

$$FN2=FN2'\,mod\,2{,}715{,}648 \qquad (Eq.\ 5)$$

In the foregoing equations, "div" represents integer division, and "mod" is modulo n division, wherein "x mod n"="the remainder when x is divided by n".

The synchronization burst SB in GSM contains 78 encoded information bits and a predetermined 64 bit training sequence, as is well known in the art. The 78 encoded information bits contain BSIC and the so-called reduced frame number, conventionally expressed in three parts, T1, T2 and T3'. The conventional relationship between the frame number (FN) of the synchronization burst SB and the parameters T1, T2 and T3' is as follows:

$$T1=FN\,div\,(26\times 51) \qquad (Eq.\ 6)$$

$$T2=FN\,mod\,26 \qquad (Eq.\ 7)$$

$$T3=FN\,mod\,51 \qquad (Eq.\ 8)$$

$$T3'=(T3-1)\,div\,10 \qquad (Eq.\ 9)$$

Thus, once the current frame number FN2 of BTS2 has been calculated as shown above with respect to equations 2–5, then the parameter T3 can be determined by plugging FN2 into equation 8 above.

In conventional GSM networks, the synchronization burst SB occurs in time slot 0 of frames 1, 11, 21, 31 and 41 of a 51-frame repeating sequence of TDMA frames transmitted on the BTS's BCCH (broadcast control channels) carrier. Thus, T3 above indicates where the current frame FN2 is located within the 51-frame repeating sequence. Because, as mentioned above, the synchronization burst SB occurs in time slot 0 of frames 1, 11, 21, 31 and 41 of this 51-frame repeating sequence, the next T3 (call it T3n) that satisfies the relationship, (T3−1) mod 10=0, will designate the frame of BTS2 in which the next synchronization burst SB will occur. The corresponding frame number (call it FN2n) is then determined by:

$$FN2n=(FN2+DT3)\,mod\,2{,}715{,}648, \qquad (Eq.\ 10)$$

where DT3=(T3n−T3) mod 51.

Now, the parameters T1, T2 and T3' can be determined by plugging FN2n into equations 6 and 7 and plugging T3n into equation 9. According to the GSM standard, the parameters T1, T2 and T3', along with the BSIC, can be expressed using 25 bits. The BSIC bits can be determined from the BSIC information received at MS1, and the bits representing T1, T2 and T3' can be determined from equations 6, 7 and 9. The mobile station MS1 can then apply to the aforementioned 25 bits, a well known coding algorithm described in the GSM standard (ETSI GSM Specification 05.03), in order to generate from those 25 bits the 78 encoded bits in the synchronization burst.

In this manner, the mobile station MS1 now knows, with respect to the frame structure timing of its own serving BTS1, the frame number FN2n of BTS2 in which the synchronization burst will occur. As mentioned above, the synchronization burst always occurs in time slot 0, so the mobile station MS1 now knows exactly when the synchronization burst will be transmitted by BTS2. Moreover, the mobile station MS1 now also knows all 78 encoded bits along with all 64 training bits of the synchronization burst. With knowledge of 142 bits rather than just 64 bits, the mobile station can achieve better accuracy in making time of arrival measurements than in the conventional situation wherein only 64 bits are known. Moreover, with 142 known bits, it is possible for the mobile station MS1 to achieve, in a far noisier environment, the same accuracy as could be achieved using 64 bits in a less noisy environment.

Figure 7:
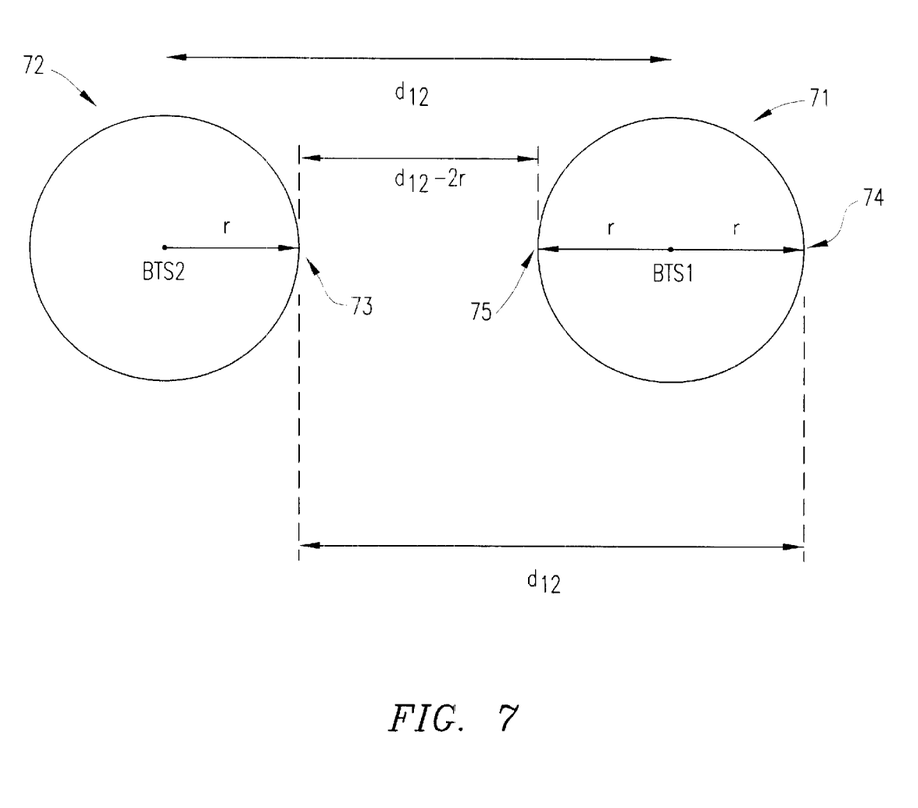
FIG. 7 illustrates how an example downlink monitoring window is determined according to the invention.

Because the position of the mobile station MS1 relative to a given neighboring BTS (e.g., BTS 28 of FIG. 2) is not known, the synchronization burst SB from that BTS will not arrive at the mobile station MS1 at precisely the time that was calculated by the mobile station. FIG. 7 illustrates one example of how a search window can be defined to encompass the time at which the synchronization burst can be expected to arrive at the mobile station MS1. Let FN denote the frame number of the next SB (SB2) that is expected to arrive from neighboring (non-serving) BTS2. How this frame number is calculated can be found in Eq. 10. MS1 knows when the corresponding SB (SB1) with the same frame number will arrive, or would have arrived, from the serving BTS1. Let this time instant be denoted by T0, relative to the mobile station's timebase.

MS1 is within the circle 71. The radius r of this circle can e.g., be determined by the cell radius or derived from the timing advance value. Consider the two extreme cases. One extreme case is when MS1 is at 74. Then SB2 arrives at time T0+RTD+d12/c since SB2 travels d12 further than SB1 does. The other extreme case is when MS1 is at 75. Then SB2 arrives at T0+RTD+(d12−2r)/c. Thus, when the mobile is between 75 and 74, SB2 arrives in the window [T0+RTD+(d12−2r)/c−k, T0+RTD+d12/c+k], where k accounts for inaccuracies in the provided RTD and d12 values.

Since RTD is known, MS1 can predict with a certain uncertainty when the SB2 from BTS2 (non serving) will arrive.

The ability to calculate a search window permits the synchronization burst to be detected with higher reliability compared to when the arrival time is completely unknown, and the complexity of the mobile station is reduced compared to prior art mobile stations. For example, data from the whole search window can be received in real time and stored for later processing, which is not realistically feasible if the search window is required to be 10 TDMA frames long, as is necessary to guarantee capturing the synchronization burst using conventional techniques. In addition, the search window permits the total measurement time to be reduced.

Use of the RTD knowledge to calculate the starting time and search window for the synchronization burst SB can significantly reduce the measurement time in making downlink OTD measurements. Without receiving the RTD information, the mobile station is conventionally required to search continuously until the frequency correction burst is detected, so that the mobile station knows the synchronization burst will occur in the next frame. With RTD information corresponding to all base transceiver stations to be measured, the mobile station can schedule the various measurements and limit the monitoring times to the search window periods, which is not possible using the prior art scanning techniques.

Figure 6:
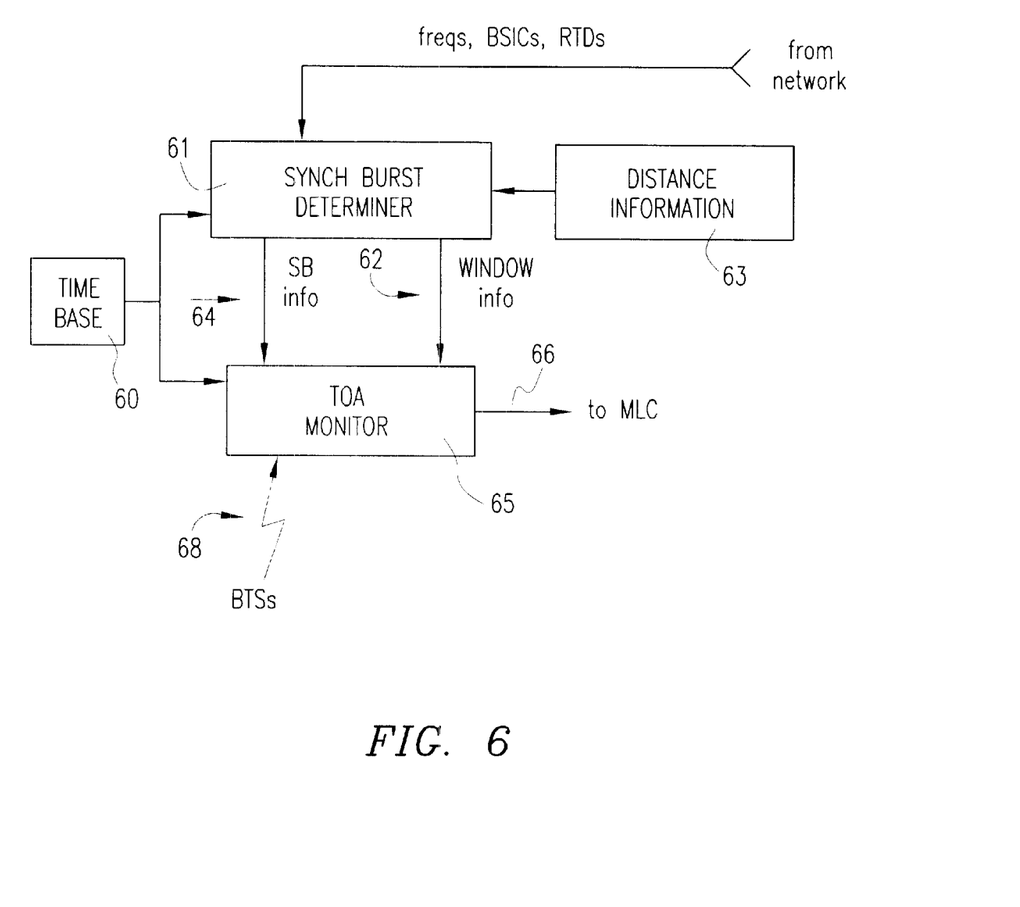
FIG. 6 illustrates pertinent portions of a mobile station having the downlink observed time difference measurement capability according to the present invention.

FIG. 6 illustrates an example implementation of a pertinent portion of the mobile station MS1 of FIG. 2 for making downlink observed time difference measurements according to the present invention. The mobile station includes a synchronization burst determiner 61 which receives as input (for example from MLC of FIG. 2 via MSC, BSC 21 and BTS 23) the frequency, the BSIC, and the RTD relative to the serving base transceiver station, of each base transceiver station selected for OTD measurements. The synchronization burst determiner also receives information about the distances between its serving base transceiver station and all neighboring base transceiver stations, along with cell radius information for all neighboring base transceiver stations. This information can be periodically updated by MLC (as MS1 roams), and stored into a memory as shown at 63 in FIG. 6, or the information can be included in the positioning request message provided to the synchronization burst determiner by MLC.

The synchronization burst determiner 61 determines for each selected BTS the approximate expected arrival time of the synchronization burst relative to the frame structure time base 60 of the serving cell (serving base transceiver station), and outputs this information at 64 to a time of arrival monitor 65. Also at 64, the synchronization burst determiner outputs to the time of arrival monitor the 78 encrypted bits and the 64 training bits of the synchronization burst of each selected BTS. The synchronization burst determiner also calculates search windows for each selected base transceiver station, and outputs this search window information at 62 to the time of arrival monitor.

The time of arrival monitor makes time of arrival measurements on the signals received from the BTSs at 68. The time of arrival monitor can use the calculated arrival time information, the window information and the 142 bit sequence information to make time of arrival measurements for each selected base transceiver station. With this information, the time of arrival monitor can efficiently schedule the various measurements and, as necessary, can capture and store the signals received during the various search windows, and then process those signals at a later time. The processing of the received signals for determination of time of arrival can be done in any desired conventional manner, or in the manners described in detail in copending U.S. Ser. No. 08/978,960 filed on Nov. 26, 1997, which is hereby incorporated herein by reference.

After the desired time of arrival measurements have been made, the time of arrival monitor can output at 66 either the time of arrival information or the observed time difference information to the MLC (via BTS 23, BSC 21 and MSC). The MLC then uses this information in conventional fashion to determine the location of the mobile station MS1, which location is then provided in a suitable message to the requesting application 21 in FIG. 2. Alternatively, if MS1 knows the geographic locations of the measured BTSs, then MS1 can calculate its own position.

It will be evident to workers in the art that the exemplary mobile station portions of FIG. 6 can be readily implemented by suitably modifying hardware, software, or both, in a data processing portion of a conventional mobile station.

Although OTD measurements on the GSM synchronization burst are described in detail above, it should be clear that the techniques of the invention are applicable to various other types of bursts as well.

In view of the foregoing description, it should be clear that the downlink observed time difference techniques of the present invention improve the sensitivity of downlink observed time difference measurements by providing the mobile station with more known bits from the synchronization burst SB, enhances the accuracy of the time of arrival and observed time difference measurements, reduces the risk of measurement errors, reduces the time required to make the necessary measurements, and requires less data processing capability in the mobile station.

Although exemplary embodiments of the present invention have been described above in detail, this does not limit the scope of the invention, which can be practiced in a variety of embodiments.

What is claimed is:

1. A method of using a mobile communication station in a wireless communication network to measure respective times of arrival of radio signals respectively transmitted by a plurality of radio transmitters in the network, comprising:

providing real time difference information indicative of when the radio signals are expected to arrive at the mobile communication station;

calculating at least one search window from said real time difference information; and the mobile communication station monitoring for arrival of the radio signals during said at least one search window.

2. The method of claim 1, wherein said providing step includes providing real time difference information indicative of respective periods of time during which the respective radio signals are expected to arrive at the mobile communication station, and said monitoring step including the mobile communication station monitoring for arrival of each radio signal during the corresponding period of time.

3. The method of claim 1, wherein said providing step further includes:

providing real time difference information indicative of differences between a time base used by a radio transmitter serving the mobile communication station and respective time bases used by the radio transmitters being measured; and in response to the real time difference information, determining, relative to the time base used by the serving radio transmitter, a plurality of points in time at which the respective radio signals are expected to arrive at the mobile communication station.

4. The method of claim 3, wherein said providing step further includes using the points in time to determine respective periods of time during which the respective radio signals are expected to arrive at the mobile communication station, and said monitoring step including the mobile communication station monitoring for arrival of each radio signal during the corresponding period of time.

5. The method of claim 4, wherein said using step includes the mobile communication station using the points in time to determine the respective periods of time.

6. The method of claim 4, wherein said using step includes accounting for respective distances to be traveled by the radio signals in order to reach the mobile communication station.

7. The method of claim 6, wherein said accounting step includes estimating, for each radio signal, a maximum possible distance of travel and a minimum possible distance of travel.

8. The method of claim 7, wherein said accounting step includes, for each radio signal, establishing a beginning point of the associated period of time based on the point in time at which arrival is expected and the minimum possible distance of travel, and establishing an ending point of the associated period of time based on the point in time at which arrival is expected and the maximum possible distance of travel.

9. The method of claim 3, wherein said determining step includes the mobile communication station determining the points in time.

10. The method of claim 3, wherein said radio signals are transmitted on time division multiple access channels, and said step of providing real time difference information includes expressing a real time difference using at least one of a frame number difference, a time slot number difference and a quarter bit number difference.

11. The method of claim 1, wherein the communication network is a cellular communication network.

12. The method of claim 11, wherein the communication network is a GSM network.

13. The method of claim 1, further comprising:
providing frequency information indicative of the respective frequencies of the measured radio signals.

14. A method of locating the position of a mobile communication station in a wireless communication network, comprising:
measuring at the mobile communication station respective times of arrival of radio signals respectively transmitted by a plurality of radio transmitters in the network, said measuring step further including:
providing real time difference information indicative of when the radio signals are expected to arrive at the mobile communication station;
calculating at least one search window based on the real time difference information; and
the mobile communication station monitoring for arrival of the radio signals during the at least one search window; and
using the measured times of arrival to locate the position of the mobile communication station.

15. The method of claim 14, further comprising:
providing frequency information indicative of the respective frequencies of the measured radio signals.

16. A method of determining the time of arrival of a radio signal at a radio communication station operating in a wireless communication network, comprising:
obtaining from the wireless communication network real time difference information from which an informational content of the radio signal can be determined but which real time difference information does not itself reveal the informational content of the radio signal;
determining the informational content of the radio signal in response to the real time difference information, the informational content indicative of at least one of the following:
an approximate expected arrival time of a synchronization burst relative to a time base used by a serving radio transmitter;
maximum bit information associated with the synchronization burst; and
a search window for the serving radio transmitter, the search window including the expected arrival time of the synchronization burst;
monitoring for arrival of the radio signal during the search window period; and
using the informational content of the radio signal to measure the time of arrival of the radio signal.

17. The method of claim 16, wherein said real time difference information includes information indicative of transmission timing of the radio signal.

18. The method of claim 16, wherein said real time difference information is indicative of a difference between a time base known to the radio communication station and a time base used by a radio transmitter from which the radio signal is to be transmitted.

19. The method of claim 16, wherein said real time difference information includes information indicative of a radio transmitter from which the radio signal is to be transmitted.

20. The method of claim 19, wherein the communication network is a GSM network, and wherein the information indicative of the radio transmitter includes a base station identity code (BSIC) which identifies a base station in the GSM network.

21. The method of claim 16, wherein the maximum bit information associated with the synchronization burst includes 78 encoded bits and 64 training bits.

22. An apparatus for use in locating the position of a mobile communication station in a wireless communication network, comprising:
a determiner for performing at least one of the following operations:
determining when each of a plurality of radio signals, respectively transmitted by a plurality of radio transmitters in the network, is expected to arrive at the mobile communication station; and
calculating at least one search windows for at least one of the plurality of radio transmitter;
a radio signal monitor for measuring respective times of arrival of the radio signals, said monitor provided in the mobile communication station and having an input coupled to said determiner to receive therefrom real time difference information indicative of when the radio signals are expected to arrive at the mobile communication station, said monitor responsive to said real time difference information to monitor for arrival of the radio signals during at least one respective search window period; and
an output for outputting the measured time of arrival information to a mobile location center, the mobile location center using the measured time of arrival information to determine the location of the mobile communication station.

23. The apparatus of claim 22, wherein said determiner is provided in the mobile communication station.

24. The apparatus of claim 22, wherein said determiner determines respective periods of time during which the respective radio signals are expected to arrive at the mobile communication station.

25. The apparatus of claim 22, wherein said determiner includes an input for receiving real time difference information indicative of differences between a time base used by a radio transmitter serving the mobile communication station and respective time bases used by radio transmitters which transmit the radio signals, said determiner responsive to the real time difference information for determining, relative to the time base used by the serving radio transmitter, a plurality of points in time at which the respective radio signals are expected to arrive at the mobile communication station.

26. The apparatus of claim 25, wherein said determiner is operable to use the points in time to determine respective periods of time during which the respective radio signals are expected to arrive at the mobile communication station.

27. The apparatus of claim 26, wherein said determiner is operable during determination of said periods of time to account for respective distances to be traveled by the radio signals in order to reach the mobile communication station, said determiner operable to estimate maximum possible distances of travel and minimum possible distances of travel and, for each radio signal, to establish a beginning point of the associated period of time based on the point in time at which arrival is expected and the minimum possible distance of travel, and to establish an ending point of the associated period of time based on the point in time at which arrival is expected and the maximum possible distance of travel.

28. The apparatus of claim 22, wherein the communication network is a cellular communication network.

29. The apparatus of claim 28, wherein the communication network is a GSM network.

30. An apparatus for measuring the time of arrival of a radio signal thereat, comprising:
   an input for receiving real time difference information from which an informational content of the radio signal can be determined but which real time difference information does not itself reveal the informational content of the radio signal;
   a determiner coupled to said input and responsive to said real time difference information for determining the informational content of the radio signal, the informational content of the radio signal indicative of at least one search window based upon the expected arrival time of a synchronization burst; and
   a radio signal monitor for measuring the time of arrival of the radio signal, said monitor coupled to said determiner for using said informational content of the radio signal in measuring the time of arrival of the radio signal.

31. The apparatus of claim 30, wherein said real time difference information includes information indicative of transmission timing of the radio signal.

32. The apparatus of claim 30, wherein said real time difference information is indicative of a difference between a time base known to the apparatus and a time base used by a radio transmitter from which the radio signal is to be transmitted.

33. The apparatus of claim 30, wherein said real time difference information includes information indicative of a radio transmitter from which the radio signal is to be transmitted.

34. The apparatus of claim 33, wherein the communication network is a GSM network, and wherein the information indicative of the radio transmitter includes a base station identity code (BSIC) which identifies a base station in the GSM network.

35. The apparatus of claim 30, wherein the apparatus is a mobile radio communication station.

36. The apparatus of claim 30, wherein said input is further adapted to receive frequency information indicative of a frequency of the measured radio signal.

37. An apparatus for measuring the time of arrival of a radio signal thereat, comprising:
   an input for receiving real time difference information from which an informational content of the radio signal can be determined but which real time difference information does not itself reveal the informational content of the radio signal;
   a determiner coupled to said input and responsive to said real time difference information for determining the informational content of the radio signal, the informational content indicative of at least one of the following:
   an approximate expected arrival time of a synchronization burst relative to a time base used by a serving radio transmitter;
   maximum bit information associated with the synchronization burst; and
   a search window for the serving radio transmitter, the search window including the expected arrival time of the synchronization burst; and
   a radio signal monitor for measuring the time of arrival of the radio signal, said monitor coupled to said determiner for using said informational content of the radio signal in measuring the time of arrival of the radio signal, and further for monitoring for arrival of the radio signal during the search window period.

38. The apparatus of claim 37, wherein said real time difference information includes information indicative of transmission timing of the radio signal.

39. The apparatus of claim 37, wherein said real time difference information is indicative of a difference between a time base known to the apparatus and a time base used by a radio transmitter from which the radio signal is to be transmitted.

40. The apparatus of claim 37, wherein said real time difference information includes information indicative of a radio transmitter from which the radio signal is to be transmitted.

41. The apparatus of claim 40, wherein the communication network is a GSM network, and wherein the information indicative of the radio transmitter includes a base station identity code (BSIC) which identifies a base station in the GSM network.

42. The apparatus of claim 37, wherein the apparatus is a mobile radio communication station.

43. The apparatus of claim 37, wherein the monitor receives at least one of the following:
   radio signals from the plurality of radio transmitters,
   synchronization burst information including:
      time of arrival information; and
      maximum bit information, the maximum bit information including 78 encoded bits and 64 training bits; and
   search window information.

44. The apparatus of claim 37, wherein said input is further adapted to receive frequency information indicative of a frequency of the measured radio signal.

45. A method of using a mobile communication station in a wireless communication network to measure respective times of arrival of radio signals respectively transmitted by a plurality of radio transmitters in the network, comprising:
   providing the mobile communication station with real time difference information indicative of differences between a time base used by a radio transmitter serving the mobile communication station and respective time bases used by the other radio transmitters;
   the mobile communication station calculating measurement search windows for each radio transmitter;

the mobile communication station determining, in response to the real time difference information and relative to the time base used by the radio transmitter serving the mobile communication station, a plurality of points in time at which respective radio signals are expected to arrive at the mobile communication station;

for each radio signal, the mobile communication station monitoring for arrival of the radio signal during the search window period; and using the measured time of arrival information to determine the location of the mobile station.

46. The method of claim 45, further comprising:

providing, to the mobile communication station, frequency information indicative of the respective frequencies of the measured radio signals.

* * * * *

UNITED STATES PATENT AND TRADEMARK OFFICE
CERTIFICATE OF CORRECTION

PATENT NO. : 6,490,454 B1 Page 1 of 1
DATED : December 3, 2002
INVENTOR(S) : Kangas et al.

It is certified that error appears in the above-identified patent and that said Letters Patent is hereby corrected as shown below:

Column 1,
Line 3, insert
-- FIELD OF THE INVENTION
The invention relates generally to locating the position of a mobile communication unit in a wireless communication network and, more particularly, to making downlink observed time difference measurements. --

Signed and Sealed this

Fourth Day of November, 2003

JAMES E. ROGAN
*Director of the United States Patent and Trademark Office*